March 11, 1969  C. C. CLEVELAND ET AL  3,432,359

SETBACK ACTIVATED, SPIN FILLED GALVANIC BATTERY

Filed May 18, 1961

INVENTORS.
C. C. CLEVELAND
H. F. FRENCH
H. S. PATTIN
BY W. O. Quesenberry
J. E. Hodges
ATTYS.

United States Patent Office 3,432,359
Patented Mar. 11, 1969

3,432,359
SETBACK ACTIVATED, SPIN FILLED
GALVANIC BATTERY
Clark C. Cleveland, Bennington, Vt., and Harry F. French, deceased, late of Cleveland, Ohio, by Cleveland Trust Company, executor, and Howard S. Pattin, Lakewood, Ohio, assignors, by mesne assignments, to the United States of America as represented by the Secretary of the Navy
Filed May 18, 1961, Ser. No. 111,115
U.S. Cl. 136—90                    1 Claim
Int. Cl. H01m 17/06

The present invention generally relates to setback activated, spin-filled galvanic batteries for use in projectiles and particularly to improvements in the electrolyte housing and cell filling system of such a battery. In batteries of this type, and electrolyte chamber is located at the spin axis of the projectile. Surrounding this chamber is the cell structure to be filled. The electrolyte is carried in a closed container, usually a glass ampule, within the electrolyte chamber and is adapted to be opened or broken upon the initial setback of the ampule caused by the violent acceleration of the projectile at firing. The electrolyte is thus freed in the chamber and forced against the longitudinal walls thereof by the centrifugal force of spin. The battery cells which surround the longitudinal walls of the chamber are therefore filled by the electrolyte from the chamber on the axis of spin.

In setback activated, spin-filled galvanic batteries, the electrolyte chamber is generally cylindrical in form with a stack of annular cells surrounding the longitudinal walls of the chamber. A fill channel is provided running the length of cell stack defining an opening between the electrolyte chamber and the cells to be filled. The acceleration of the projectile during firing causes breaking of the glass ampule and also causes the electrolyte to be forced to the rear of the chamber. After acceleration, the projectile is subjected to slight deceleration forces thereby causing the electrolyte to flow forward in the fill channel. The electrolyte thus fills the cells in sequence, the next cell being filled as the preceding one is full.

It is important in the operation of such a battery that the amount of electrolyte be carefully controlled, not only as to the amount within the ampule, but also as to the total amount transferred from the chamber to the fill channel and thence to the cells. An excess of electrolyte will over fill the cells and the electrolyte paths around the cells will cause shorting of the individual cells; also, a deficiency of electrolyte reaching the cells will result in the last cells being unfilled or inadequately filled, as the case may be.

The amount of electrolyte within an ampule is easily controlled. The problems are encountered in assuring that all the electrolyte within the ampule reaches the cells after the ampule is shattered. The first problem occurs in locating the center of the spin chamber on the axis of spin of the projectile. If the cylindrical chamber is displaced from the spin axis of the projectile, the result will be that a portion of the electrolyte will be trapped against the side of the chamber fartherest away from the axis of spin. That portion of the electrolyte contained in the portion of the chamber furtherest from the spin axis cannot reach the fill channel since it must flow against the centrifugal force of spin. A second problem is encountered when the broken ampule pieces trap portions of electrolyte between themselves and the walls of the chamber. The combination of these problems can cause considerable variance in the amount of electrolyte reaching the cells. It is necessary in the solution of these problems to also provide for adequate cushioning of the ampule within the chamber so that it will not break by accident during the ordinary roughness of handling.

It is an object of this invention to provide an improved setback activated, spin-filled galvanic battery in which the amount of electrolyte reaching the cells of the battery from the electrolyte chamber is neither deficient nor excessive notwithstanding small variances in the spin axis of the battery or trapping of electrolyte by portions of its original container.

Another object of the invention is to provide a new and improved electrolyte ampule housing for use in a setback activated, spin-filled galvanic battery which assures the transfer of substantially all of the electrolyte from the ampule housing to the cells while providing proper cushioning of the ampule during handling and maintaining simplicity of construction, compactness and inexpensiveness.

Various other objects and advantages will be apparent from the following description of one embodiment of the invention, and the novel features will be particularly pointed out hereinafter in the appended claim.

Figure 2:
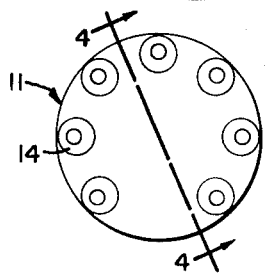
FIG. 2 is a top plan view of the battery shown in FIG. 1.
Figure 1:
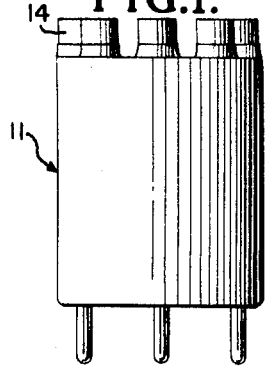
FIG. 1 is a side elevational view of a battery incorporating the present invention.
Figure 3:
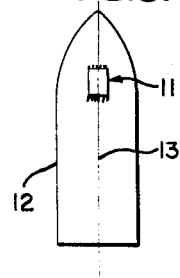
FIG. 3 is a schematic view of the battery properly oriented within a projectile.

Referring now to the drawing, wherein a preferred embodiment of the invention is illustrated, the setback activated, spin-filled battery 11 is shown contained within a projectile 12 centered on the approximate axis of spin 13 of the projectile. The battery contains external connections 14 adapted for connection to certain battery powered equipment located within the projectile, but not shown since it is unnecessary for an understanding of the invention.

Figure 4:
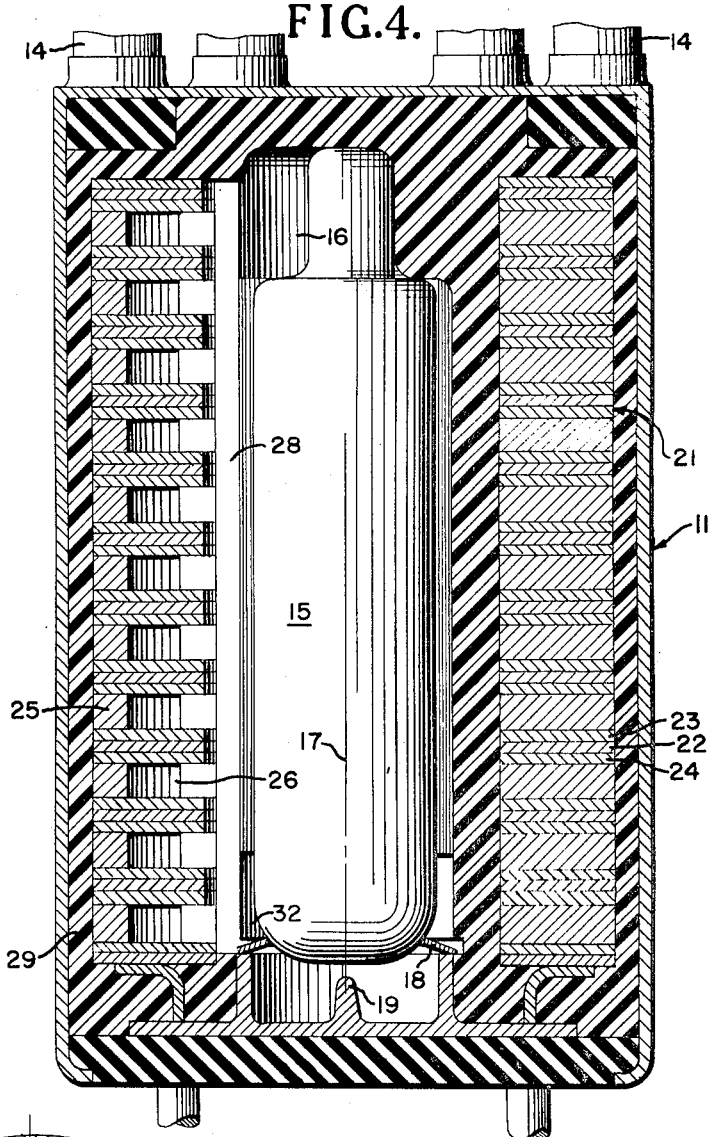
FIG. 4 is an enlarged cross-sectional view taken along line 4—4 of FIG. 2.
Figure 5:
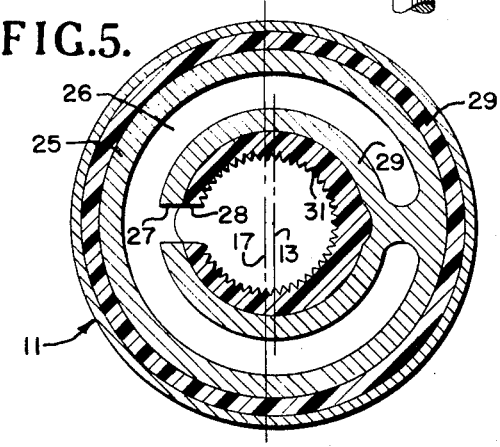
FIG. 5 is an enlarged cross-sectional view along line 5—5 of FIG. 1 at the point shown on FIG. 4.

Within the battery is shown a source of electrolyte; in this case a shatterable glass ampule 15, located within an electrolyte housing chamber 16. The ampule housing chamber 16 is substantially cylindrical in shape with the longitudinal center axis 17 thereof being parallel to and in close proximity to but slightly displaced from the predicted spin axis 13 of the projectile, the reason therefor being described later in detail. The ampule is held in position in the housing chamber by a resilient member, in this case taking the form of a snap ring 18 located at the bottom, as illustrated in FIG. 4, of the chamber. The snap ring acts to hold the ampule above the projection 19, which acts to break the ampule on initial setback caused by firing of the projectile.

Surrounding the ampule housing is a cell structure 21 comprising a group of individual galvanic cells to be filled with electrolyte during the flight of the projectile. The individual cells comprise conductive shims 22 coated with suitable electrically active, dissimilar metallic layers 23 and 24 such as lead and lead oxide, as the case may be. The separate shims 22 are annular in shape and are separated by spacers 25 which form therebetween electrolyte pockets 26 to be filled through the opening in each of the spacers at 27. The entire cell structure 21 forms a cylindrical structure about the ampule housing.

On one side of the ampule housing 16 is defined a fill channel 28 located adjacent the cell openings 27. The fiill channel 28 extends the length of the stacked cells to define a direct opening between the ampule housing chamber 16 and the cells to be filled.

The material 29 defining the housing chamber 16 is a non-conductive potting resin which additionally performs the function of a stack liner for the stacked cells and imparts rigidity to the entire battery structure. In constructing the battery the resin potting material is poured over the cell structure 21 and around a removable form defining the ampule housing chamber 16 and the fill channel 28.

The top portion of the ampule housing has serrations 31 surrounding the walls of the chamber. At the bottom thereof is a portion of the chamber wall free from serrations and known as a back channel 32. The serrations perform the double purpose of providing a cushioning effect for the glass ampule before firing of the projectile thereby preventing breakage of the ampule during handling and further providing a means for draining electrolyte from below the fragments of the shattered ampule after firing. The latter function is important in assuring that substantially all of the electrolyte originally contained within the ampule reaches the cells. The serrations also perform an additional function in relation to the aforesaid slight displacement of the longitudinal axis of the ampule housing chamber from the predicted axis of spin, the reason for which will be more obvious as description of the operation of the device proceeds. It will suffice, however, to state now that the serrations serve to provide increased friction between the walls of the chamber and the fragments of the shattered ampule to prevent many of the fragments from sliding into the fill channel and hampering substantially the filling of the cells.

In operation, the projectile 12 containing the battery 11 is placed within a gun for firing. The firing of the gun produces violent acceleration of the projectile which causes the ampule 15 to move downward in the chamber 16 by force of setback against the upward force of the snap ring 18 causing the ampule to shatter on the projection 19. By this time a substantial spin has been imparted to the projectile by the rifling of the gun. The electrolyte released by the ampule flows to the bottom of the battery and against the walls by the combined action of further acceleration within the gun bore and the centrifugal force of the spin, respectively, thus transferring most of the electrolyte from the serrated portion to the smooth back channel 32 and thence to the fill channel 28. It will be appreciated that much of the electrolyte will reach the fill channel 28 without flowing first to the back channel 32 since the centrifugal force of spin is great and the amount of electrolyte is greatly in excess of the capacity of the back channel. However, the back channel arrangement does serve to drain the electrolyte from between the serrations which might otherwise be trapped therein by the centrifugal force of spin.

After the projectile leaves the gun bore, the electrolyte left in the back channel 32 and fill channel 28 is subjected only to the centrifugal force of spin and slight deceleration forces of the atmosphere through which the projectile passes. The remaining electrolyte not already within the cells flows forward along the fill channel 28 filling the unfilled cells in sequence.

At this time, the reason for the aforesaid slight offset of the longitudinal axis of the ampule housing chamber from the predicted axis of spin of the projectile will now be described. It is to be noted that this offset of the chamber center is toward the center of the fill channel 28. The amount of the offset is the maximum deviation of the true spin axis of the projectile 12 from the predicted spin axis 13 such that the chamber walls at the edge of the fill channel will always be located at the farthest distance from the true spin axis. Since the true spin axis is never exactly determined before installation of the battery in the projectile, this offset arrangement prevents trapping of portions of the electrolyte on the chamber walls away from the fill channel 28 due to the true spin axis being displaced from the predicted axis by a small amount in that direction. Thus, the centrifugal force of spin acts to force the liquid around the walls toward the fill channel 28 and into the cell structure 21 resulting in activation of the battery.

This offset arrangement also tends to force the particles of the shattered ampule toward the fill channel. Although it is expected that a certain amount of fragments will be found in the fill channel due to the original shattering of the ampule, a greater number increases the possibility of trouble from this source. Therefore, the serrations serve the alternative purpose of providing increased friction and barriers to the movement of the glass particles toward the fill channel by the offset arrangement.

It will be understood that various changes in the details, materials, steps and arrangements of parts, which have been herein described and illustrated in order to explain the invention, may be made by those skilled in the art within the principle and scope of the invention as expressed in the appended claim.

What is claimed is:

1. In a setback activated spin-filled galvanic battery having an electrolyte housing defining a chamber therein, a breakable electrolyte ampule within said chamber, and a cell structure to be filled by said electrolyte, the improvement comprising a serrated surface on the periphery of said chamber, whereby a fluid electrolyte is easily drained from beneath portions of the said ampule after breaking and the ampule is cushioned before breaking thereby.

References Cited

UNITED STATES PATENTS

| | | |
|---|---|---|
| 2,403,567 | 5/1946 | Wales. |
| 2,441,896 | 5/1948 | Moir _____ 136—113.4 X |
| 2,927,145 | 3/1960 | Burrell _____ 136—162 X |
| 2,931,849 | 4/1960 | Burrell _____ 136—90 X |
| 2,975,482 | 3/1961 | Babcock _____ 136—90 |

FOREIGN PATENTS 1,091,667   11/1954   France.

BENJAMIN R. PADGETT, *Primary Examiner.*

MICHAEL J. McGREAL, *Assistant Examiner.*

U.S. Cl. X.R.

136—160